(12) United States Patent
Henry et al.

(10) Patent No.: US 11,731,209 B2
(45) Date of Patent: Aug. 22, 2023

(54) SYSTEM AND METHOD PROVIDING RAPID DECAY OF PEAK PULSE CURRENT

(71) Applicant: Lincoln Global, Inc., Santa Fe Springs, CA (US)

(72) Inventors: Judah B. Henry, Painesville, OH (US); Daniel P. Fleming, Painesville, OH (US)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 569 days.

(21) Appl. No.: 16/897,395

(22) Filed: Jun. 10, 2020

(65) Prior Publication Data
US 2021/0101219 A1 Apr. 8, 2021

Related U.S. Application Data

(60) Provisional application No. 62/910,637, filed on Oct. 4, 2019.

(51) Int. Cl.
*B23K 9/09* (2006.01)
*B23K 9/095* (2006.01)
*B23K 9/10* (2006.01)

(52) U.S. Cl.
CPC .............. *B23K 9/092* (2013.01); *B23K 9/095* (2013.01); *B23K 9/1006* (2013.01)

(58) Field of Classification Search
CPC ...... B23K 9/1006; B23K 9/095; B23K 9/092; B23K 9/093
See application file for complete search history.

(56) References Cited

U.S. PATENT DOCUMENTS

| | | | |
|---|---|---|---|
| 4,972,064 | A | 11/1990 | Stava |
| 5,148,001 | A | 9/1992 | Stava |
| 6,215,100 | B1 | 4/2001 | Stava |
| 8,785,816 | B2 | 7/2014 | Kooken et al. |
| 9,120,172 | B2 | 9/2015 | Dodge et al. |
| 9,221,116 | B2 | 12/2015 | Dodge et al. |
| 9,718,147 | B2 | 8/2017 | Denney et al. |
| 9,751,150 | B2 | 9/2017 | Daniel et al. |

(Continued)

FOREIGN PATENT DOCUMENTS

EP   1 949 997 A1   7/2008

*Primary Examiner* — Brian W Jennison
(74) *Attorney, Agent, or Firm* — David J. Muzilla (57) ABSTRACT

Embodiments of welding systems and methods for reducing spatter in pulsed welding are disclosed. A welding power source includes a first welding output stud to be electrically connected to a consumable welding electrode and a second welding output stud to be electrically connected to a workpiece. Power electronics generate welding output current pulses. A switching network is connected between the power electronics and the first welding output stud. A controller is connected between the power electronics and the switching network. The controller controls the timing of each welding output current pulse and switches the switching network back and forth between a first welding output current flowing state and a second welding output current impeding state based on the timing. An increase in a decay rate of a trailing edge of each welding output current pulse is effected during the second welding output current impeding state.

19 Claims, 5 Drawing Sheets

(56) References Cited

U.S. PATENT DOCUMENTS

2005/0006367 A1\* 1/2005 Dodge .................... B23K 9/18
                                                219/130.1
2015/0129566 A1\* 5/2015 Peters ................... B23K 9/093
                                                219/130.21
2015/0283638 A1   10/2015 Henry et al.
2017/0189986 A1    7/2017 Henry
2019/0030634 A1\*  1/2019 Henry .................. H01L 29/783

\* cited by examiner

SYSTEM AND METHOD PROVIDING RAPID DECAY OF PEAK PULSE CURRENT

CROSS REFERENCE TO RELATED APPLICATION/INCORPORATION BY REFERENCE

This U.S. patent application claims priority to and the benefit of U.S. provisional patent application Ser. No. 62/910,637 filed on Oct. 4, 2019, which is incorporated herein by reference in its entirety. U.S. Pat. No. 4,972,064, issued on Nov. 20, 1990, is incorporated herein by reference in its entirety. U.S. Pat. No. 6,215,100 B1, issued on Apr. 10, 2001, is incorporated herein by reference in its entirety. U.S. Published Patent Application No. 2015/0129566 A1, published on May 14, 2015, is incorporated herein by reference in its entirety. U.S. Pat. No. 9,751,150 B2, issued on Sep. 5, 2017, is incorporated herein by reference in its entirety. U.S. Pat. No. 8,785,816 B2, issued on Jul. 22, 2014, is incorporated herein by reference in its entirety.

FIELD

Embodiments of the present invention relate to welding machines and methods, and more specifically to welding machines and methods providing the ability to rapidly decay a peak pulse current of a pulsed welding current to mitigate spatter of molten metal material during a pulsed welding process.

BACKGROUND

Currently, poor pulse welding performance can result due to a pulse droplet of molten metal material being difficult to transfer from the tip of a consumable electrode to a workpiece. A long tether of molten metal material can form behind the main pulse droplet resulting in shorting and spatter. Low wire feed speed stainless pulse arc welding processes are particularly susceptible to such poor performance.

SUMMARY

Embodiments of the present invention are related to welding power sources and methods for performing reduced spatter pulsed arc welding. One embodiment of a welding power source includes a pair of welding output studs having a first welding output stud configured to be electrically connected to a consumable welding electrode via at least a first welding cable, and a second welding output stud configured to be electrically connected to a workpiece via at least a second welding cable. The welding power source also includes power electronics configured to generate a plurality of welding output current pulses and a switching network operatively connected between the power electronics and the first welding output stud. The welding power source includes a controller operatively connected between the power electronics and the switching network. The controller is configured to control a timing of each welding output current pulse of the plurality of welding output current pulses and switch the switching network back and forth between a first welding output current flowing state and a second welding output current impeding state based on the timing. As a result, an increase in a decay rate of a trailing edge of said each welding output current pulse of the plurality of welding output current pulses is effected at the pair of welding output studs during the second welding output current impeding state. In one embodiment, the switching network includes an electrical switch in parallel with a resistor or a snubber. The electrical switch may include a high power transistor and the snubber may include a resistor in series with a capacitor. In one embodiment, the power electronics includes a main choke that is in series with the resistor or the snubber. The electrical switch is closed during the first welding output current flowing state and the electrical switch is open during the second welding output current impeding state. In one embodiment, the switching network includes a controllable variable resistance to vary a background current level of the plurality of welding output current pulses under the control of the controller. In one embodiment, the controller is configured to effect the increase in the decay rate of the trailing edge of each welding output current pulse of the plurality of welding output current pulses at the pair of welding output studs, via the timing and the switching network, when an inductance of a welding output circuit path operatively connected to the welding power source via the pair of welding output studs is above a defined threshold value. The welding output circuit path includes the first welding cable, at least a portion of the consumable welding electrode, at least a portion of the workpiece, and the second welding cable. In one embodiment, the controller is configured to effect the increase in the decay rate of the trailing edge of each welding output current pulse of the plurality of welding output current pulses at the pair of welding output studs, via the timing and the switching network, when a welding wire feed speed of a wire feeder, operatively connected to the welding power source and feeding the consumable welding electrode, is below a defined threshold value. In one embodiment, the power electronics includes a pulse width modulator configured to operate at an operating frequency of at least 20 kilohertz. In one embodiment, a pulse repetition rate of the plurality of welding output current pulses is between 50 to 400 cycles per second.

One embodiment of a method performed by a welding power source includes generating a plurality of welding output current pulses in a welding output circuit path and controlling shapes and timing parameters of the plurality of welding output current pulses as part of generating the plurality of welding output current pulses. The method also includes effecting an increase in a decay rate of a trailing edge of each welding output current pulse of the plurality of welding output current pulses by introducing an impedance in the welding output circuit path over a predefined (or determined) period of impeding time for each welding output current pulse of the plurality of welding output current pulses based on the timing parameters. In one embodiment, the method includes tracking a first time from a beginning of a leading edge to reaching a peak amplitude of each welding output current pulse of the plurality of welding output current pulses, determining when a second time has elapsed corresponding to a duration of the peak amplitude for each welding output current pulse of the plurality of welding output current pulses, and starting the effecting of the increase in the decay rate of the trailing edge of each welding output current pulse of the plurality of welding output current pulses in response to the second time elapsing. The timing parameters include the predefined (or determined) period of impeding time and at least one of a pulse repetition frequency of the plurality of welding output current pulses, a pulse width of each welding output current pulse of the plurality of welding output current pulses, a leading edge start time of each welding output current pulse of the plurality of welding output current pulses, a time when a peak amplitude is first reached for each welding output current pulse of the plurality of welding output current pulses, a predetermined peak amplitude time duration after the peak amplitude is first reached for each welding output current pulse of the plurality of welding output current pulses, and a trailing edge start time for each welding output current pulse of the plurality of welding output current pulses. In accordance with various embodiments, the polarity of the plurality of welding output current pulses may be positive, negative, or a combination of both positive and negative. In one embodiment, the method is performed during a low wire feed speed stainless, nickel, or steel pulse welding process. In one embodiment, the method includes varying the impedance in a controlled manner to change a background current level of the plurality of welding output current pulses. In one embodiment, introducing the impedance in the welding output circuit path is accomplished by opening an electrical switch that is in parallel with a resistor or a snubber, and removing the impedance from the welding output circuit path is accomplished by closing the electrical switch after the predefined (or determined) period of impeding time.

Numerous aspects of the general inventive concepts will become readily apparent from the following detailed description of exemplary embodiments and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
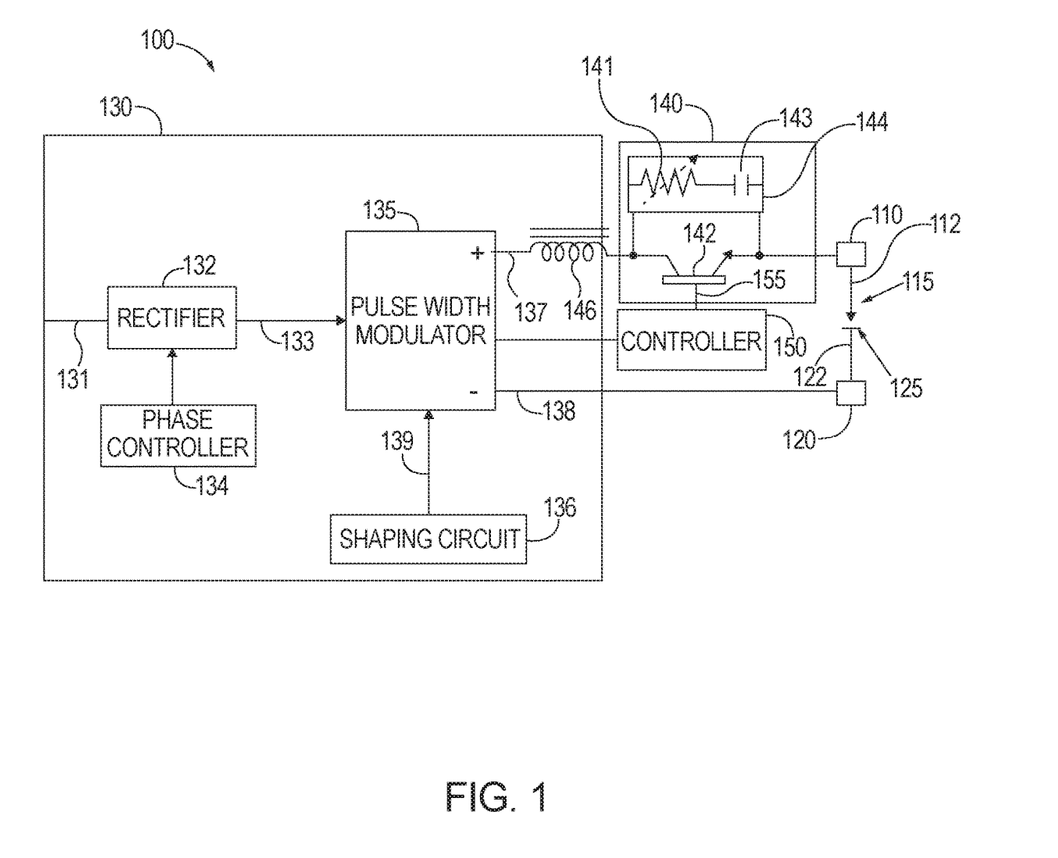
FIG. 1 illustrates a schematic block diagram of one embodiment of a welding system configured to generate a plurality of welding output current pulses.

The examples and figures herein are illustrative only and are not meant to limit the subject invention, which is measured by the scope and spirit of the claims. FIG. 1 illustrates a schematic block diagram of one embodiment of a welding system 100 configured to generate a plurality of welding output current pulses. The welding system 100 includes a pair of welding output studs including a first welding output stud 110 and a second welding output stud 120. The term output stud is used herein in a general sense and could also be referred to as, for example, an output port, an output terminal, or an output connection. The first welding output stud 110 is configured to be electrically connected to a consumable welding electrode 115 via at least a first welding cable 112. For example, in one embodiment, the first welding cable 112 may connect between the first welding output stud 110 and a wire feeder (not shown). A welding gun (not shown) may connect to the wire feeder. As is known in the art, the wire feeder may feed the consumable welding electrode 115 (e.g., a consumable wire electrode) into the welding gun and toward a workpiece 125. Electrical welding output power provided at the first welding output stud 110 is applied to the consumable welding electrode 115 via the first welding cable, the wire feeder, and the welding gun. The second welding output stud 120 is configured to be electrically connected to the workpiece 125 via at least a second welding cable 122.

Figure 3:
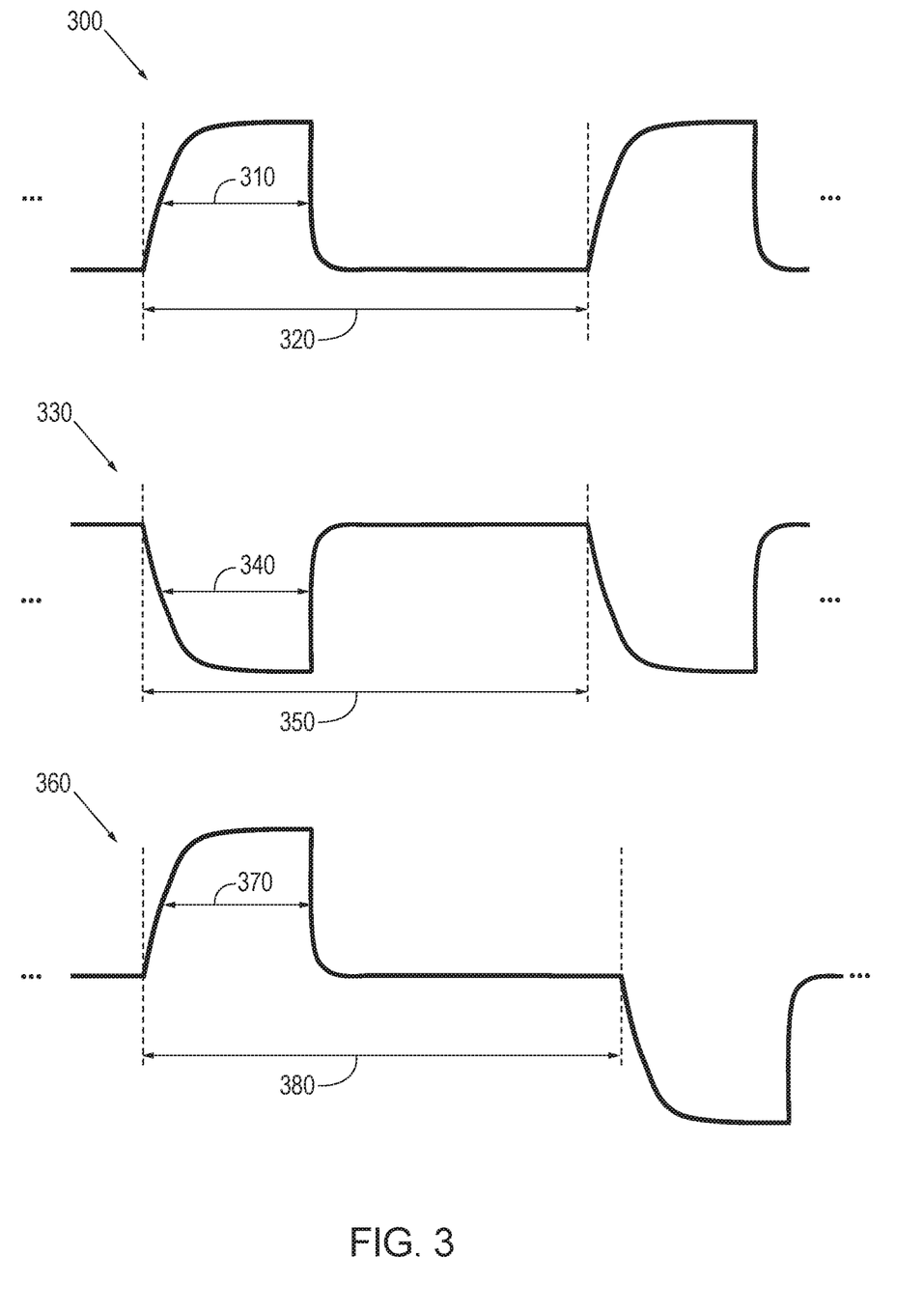
FIG. 3 illustrates a schematic diagram of several different example embodiments of a plurality of welding output current pulses.

The welding system 100 also includes power electronics 130 configured to generate a series of welding output current pulses (e.g., see FIG. 3). The welding system 100 also includes a switching network 140 operatively connected between the power electronics 130 and the first welding output stud 110. The welding system 100 further includes a controller 150 operatively connected between the power electronics 130 and the switching network 140. The controller 150 is configured to control the timing of each welding output current pulse of the series of welding output current pulses produced by the power electronics 130 and switch the switching network 140 back and forth between a first welding output current flowing state and a second welding output current impeding state. The switching is based on the timing, and effects an increase in a decay rate of a trailing edge of each welding output current pulse in the series at the pair of welding output studs 110 and 120 during the second welding output current impeding state (as discussed further later herein). The increase in the decay rate is relative to what the decay rate would be without switching to the impeding state.

In the embodiment of FIG. 1, the power electronics 130 acts as a D.C. power supply that accepts an AC power at line 131 as input power. The AC power at line 131 is then rectified by a rectifier 132 to form a DC current at line 133. A phase controller 134 controls the rectifier 132 to produce a substantially uniform DC current at line 133. The DC current at line 133 is then directed into a pulse width modulator 135. The shapes of the pulses are controlled by a shaping circuit 136 to thereby create a desired pulse with the DC current at line 133 through output terminals 137 and 138. As can be appreciated, the power electronics 130 need not provide a rectified output but can be any other appropriate DC source, in accordance with some other embodiments. The DC current from the pulse width modulator 135 is directed across a welding area which includes the consumable welding electrode 115 and the workpiece 125.

The power electronics 130 may include various types of circuitry including, for example, at least one of a microprocessor, an application specific integrated circuit (ASIC), a field programmable gate array (FPGA), a digital signal processor, a programmable logic device (PLD), and a memory. In some embodiments, the power electronics may include chopper circuitry or inverter circuitry, for example, as is known in the art. U.S. Pat. No. 9,751,150, issued on Sep. 5, 2017, is incorporated herein by reference in its entirety, and is concerned with power electronics technology. Also, U.S. Pat. No. 8,785,816 entitled "Three Stage Power Source for Electric Arc Welding," issued on Jul. 22, 2014, is incorporated herein by reference in its entirety, and is concerned with power and control electronics.

In accordance with one embodiment, a welding cycle, which is repeated several times per second, is accurately controlled by the controller 150 for the purpose of reducing spatter at various times during the welding cycle. The pulse width modulator 135 operates at a high frequency. In one embodiment, the operating frequency of the pulse width modulator 135 is 20 kHz with a width of the successive current pulse being determined by the voltage on line 139 from the shaping circuit 136. As the system demands more current in the welding cycle (e.g., due to feedback), a higher voltage appears on line 139 causing a wider pulse during the next pulse from the pulse width modulator 135. Thus, the demanded current for the welding cycle is changing 120,000 times each second. Since the rate of the welding cycle (pulse repetition rate) is generally in the neighborhood of 50 to 400 cycles per second, many update pulses are provided during each welding cycle, in accordance with one embodiment. However, other pulse repetition rates are possible as well, in accordance with other embodiments.

The switching network 140 includes an electrical switch 142 (e.g., a high power transistor) and a resistor or snubber 144 (the snubber may include a resistor 141 in series with a capacitor 143). In accordance with one embodiment, the electrical switch 142 is in parallel with the resistor or snubber 144. When the timing associated with the welding output current pulses being generated indicates that a present current pulse is at its trailing edge, the controller 150 changes the signal (e.g. the polarity) on line 155 to open the electrical switch 142. This places the resistor or snubber 144 in series with a main choke 146 of the power electronics 130. In one embodiment, the main choke 146 has a small inductive reactance and very little energy is stored in the welding output circuit path. Consequently, the current flow caused by the welding output circuit path between the electrode 115 and the workpiece 125 is quickly dropped to a level determined by the resistor or snubber 144 and, for example, the open circuit voltage (OCV) of the welding power source. That is, a decay rate of the trailing edge of the present current pulse is significantly increased over what it would be if the electrical switch 142 were still closed. The increase in the decay rate is configured to be enough to greatly reduce, if not totally eliminate spatter, as discussed further herein with respect to FIG. 2.

In accordance with one embodiment, even with significant inductance in the welding output circuit path, the actual current will not overshoot the defined background level of Amps=OCV/Resistance. In accordance with one embodiment, a variable resistance can be provided via the resistor or snubber or other similar device such as a background circuit and a switched peak circuit with a snubber. In this manner, the background current can be varied, if desired, while still having the desired rapid decay rate, even with significant inductance in the welding output circuit path. The dashed-line arrow shown across the resistor 141 in FIG. 1 indicates that the resistance may be variable, in accordance with an optional embodiment.

Figure 2:
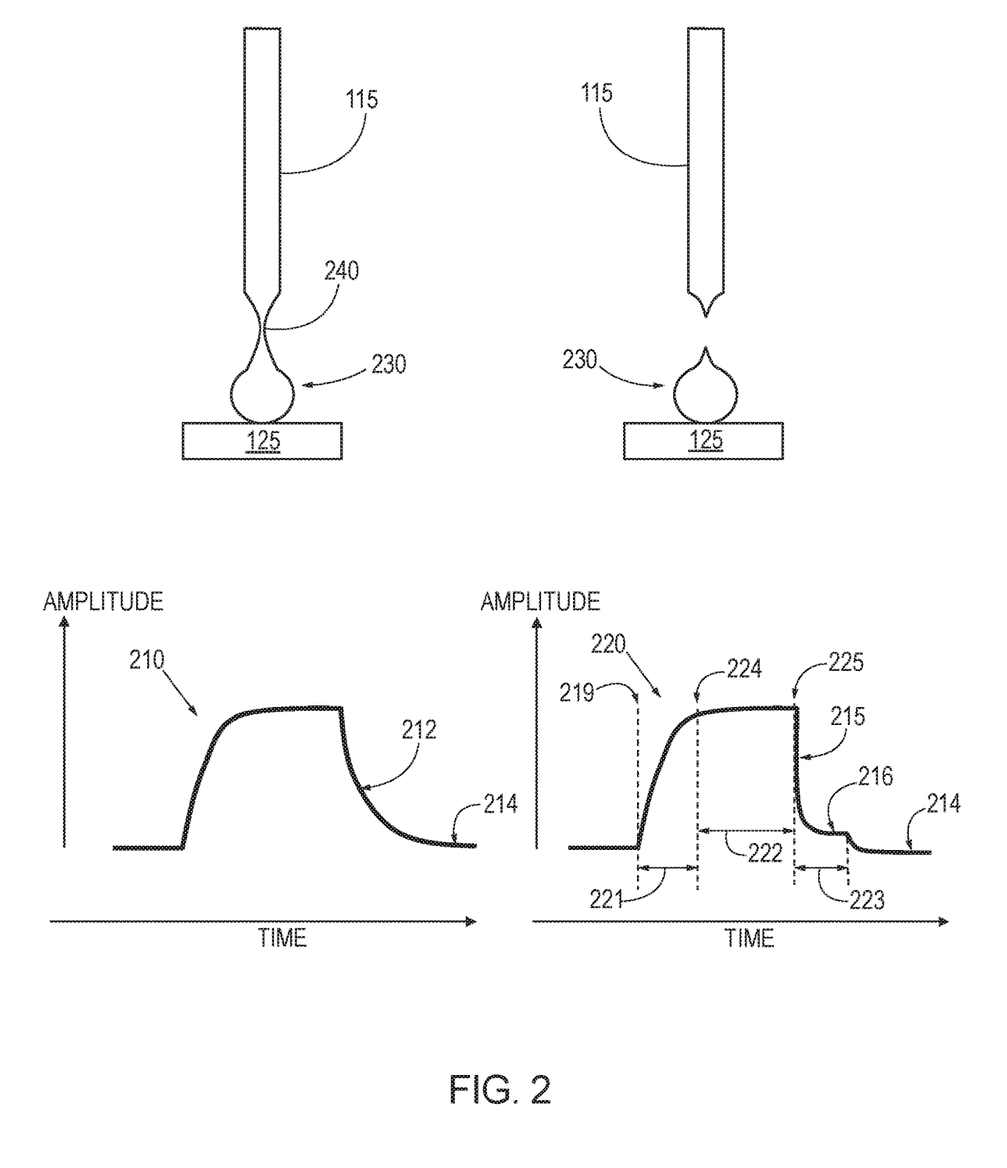
FIG. 2 illustrates a schematic diagram showing a conventional welding output current pulse and one embodiment of a welding output current pulse of the present invention having a rapidly decaying trailing edge.

FIG. 2 illustrates a schematic diagram showing a conventional welding output current pulse 210 having a slowly decaying trailing edge 212, and one embodiment of a welding output current pulse 220 of the present invention having a rapidly decaying trailing edge 215. FIG. 2 shows two possible background current levels 214 and 216. The background current levels 214 and 216 are dependent, at least in part, on the amount of resistance provided by the switching network 140 during a predefined (or determined) period of impeding time. The time interval 221 corresponds to a time 219 from the beginning of a leading edge of the current pulse 220 to reaching a peak amplitude of the current pulse 220 at a peak amplitude start time 224. The time interval 222 (e.g., an additional predetermined time being a duration of the peak amplitude), corresponds to the time 224 from reaching the peak amplitude of the current pulse 220 to a beginning of a trailing edge of the current pulse 220 at a trailing edge start time 225. The time interval 223, in one embodiment, corresponds to the predefined period of impeding time.

FIG. 3 illustrates a schematic diagram of several different embodiments of a plurality of welding output current pulses. The plurality of welding output current pulses 300 are of a positive polarity and have a pulsewidth 310 and a pulse repetition interval 320. The pulse repetition interval is the reciprocal of the pulse repetition frequency. The plurality of welding output current pulses 330 are of a negative polarity and have a pulsewidth 340 and a pulse repetition interval 350. The plurality of welding output current pulses 360 include both positive and negative polarities and have a pulsewidth 370 and a pulse repetition interval 380. In accordance with one embodiment, the pulsewidth is defined at the 50% amplitude level of the pulse.

As shown in FIG. 2, when the conventional welding output current pulse 210 is applied, a molten metal ball 230 forms at the tip of the electrode 115 and a tether 240 of molten metal material forms between the ball 230 and the solid portion of the electrode 115 as the ball 230 transfers to the workpiece 125 (see the left half of FIG. 2). When the ball 230 makes contact with the workpiece 125, the ball 230 and the tether 240 cause an electrical short to occur between the workpiece 125 and the electrode 115. As a result, the molten metal ball 230 and the molten metal tether 240 can explode, causing spatter to occur. However, when the welding output current pulse 220 of one embodiment of the present invention is applied, the molten metal ball 230 forms at the tip of the electrode 115 and separates from the electrode 115 before depositing on the workpiece 125 (i.e., a tether is not maintained to cause a short . . . see the right half of FIG. 2). The increased decay rate of the welding output current pulse 220, due to the resistor or snubber 144 of the switching circuit 140 at the time of the trailing edge 215, causes such separation and helps mitigate, if not totally eliminate, any splatter from occurring.

Again, the time to open the electrical switch 142 for a given welding output current pulse 220 is determined by the controller 150. Various timing techniques may be used to determine when to open and close the electrical switch 142, in accordance with various embodiments. For example, in one embodiment, a time is tracked by the controller 150 from the beginning of a leading edge of the pulse 220 (i.e., the ramp up or leading edge start time 219) to when the peak amplitude of the pulse 220 is first reached at 224. When the additional predetermined time 222 has elapsed (as determined by the controller 150) the duration of the peak amplitude is complete and the trailing edge 215 (ramp down) begins at time 225. It is at the end of this additional predetermined time 222 that the electrical switch 142 is opened by the controller 150, allowing the resistor or snubber 144 to increase the decay rate of the trailing edge 215. The electrical switch 142 is closed again (under the control of the controller 150) after some later time interval before ramping up of the next welding output current pulse occurs. The process repeats for each welding output current pulse generated by the power electronics 130. During the time at which the electrical switch 142 is closed, the system 100 is in a first welding output current flowing state. During the time at which the electrical switch 142 is open, the system 100 is in a second welding output current impeding state.

In accordance with another embodiment, the decay rate of the trailing edges of the current pulses may be increased (via the electrical switch 142 and resistor or snubber 144 under control of the controller 150) in a similar manner to that above, but only when the inductance of the welding output circuit path is above a defined threshold value. Techniques for measuring the inductance of a welding output circuit path are known in the art. A value of the inductance is provided to the controller 150, in accordance with one embodiment. During a pulse welding process, when the heat input is too low, the tether can be more pronounced. Therefore, in accordance with yet another embodiment, the decay rate of the trailing edges of the current pulses may be increased (via the electrical switch 142 and resistor or snubber 144 under control of the controller 150) when, for example, the welding wire feed speed is below a defined threshold value (e.g., 250 inches per minute). Techniques for measuring wire feed speed are also known in the art. A value of the wire feed speed is provided to the controller 150, in accordance with one embodiment.

Figure 4:
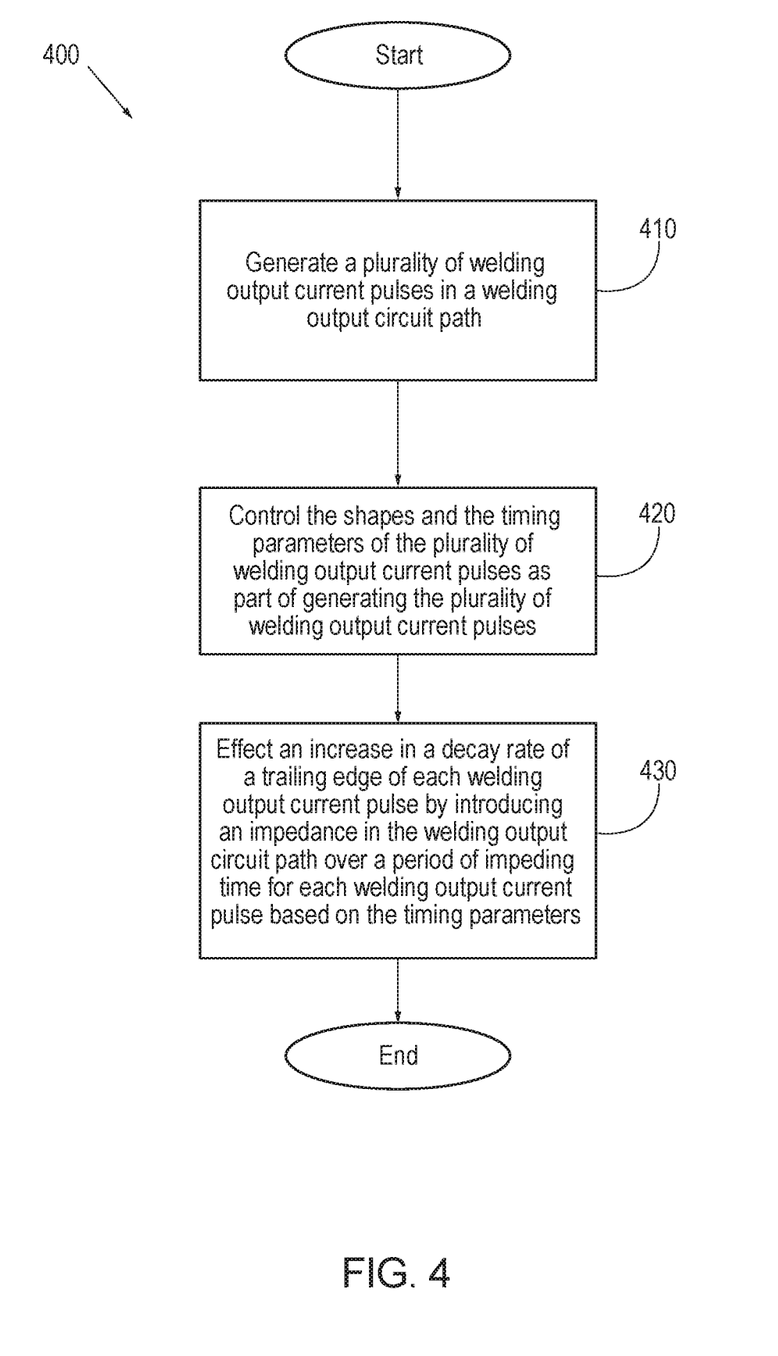
FIG. 4 illustrates a flow chart of one embodiment of a method of generating welding output current pulses having rapidly decaying trailing edges.

FIG. 4 illustrates a flow chart of one embodiment of a method 400 of generating welding output current pulses having rapidly decaying trailing edges to mitigate spatter. At block 410, multiple welding output current pulses are generated in a welding output circuit path of a welding system. At block 420, the shapes and the timing parameters of the multiple welding output current pulses are controlled as part of generating the multiple welding output current pulses. In accordance with one embodiment, the timing parameters may include a pulse repetition frequency (the inverse of the pulse repetition interval), a pulse width of each pulse, a leading edge start time of each pulse, a time when a peak amplitude is first reached for each pulse, an additional predetermined time after the peak amplitude is first reached for each pulse, and a trailing edge start time of each pulse. Additional or other timing parameters are possible as well, in accordance with other embodiments. At block 430, an increase in a decay rate of the trailing edges of the multiple welding output current pulses is effected by introducing an impedance (via a resistor or snubber) in the welding output circuit path over a predefined (or determined) period of impeding time (corresponding to the second welding output current impeding state) for each welding output current pulse based on at least one or more of the timing parameters.

In accordance with one embodiment, the method may include tracking a first time from a beginning of a leading edge to reaching a peak amplitude of each welding output current pulse of the multiple welding output current pulses. The elapse of a second time is determined corresponding to a duration of the peak amplitude for each welding output current pulse. An increase in the decay rate of the trailing edge of each welding output current pulse is effected in response to the second time elapsing for each welding output current pulse.

In accordance with various embodiments of the present invention, positive polarity current pulses, negative polarity current pulses, or both positive and negative polarity current pulses can be generated having a rapid decay rate (e.g., see FIG. 3). Based on the information provided herein, one of ordinary skill in the art can readily extrapolate to designs to handle such polarity cases. In this manner, reduced spatter pulsed welding can be achieved in pulse welding processes, especially in low wire feed speed stainless pulse welding processes where the spatter problem can be pronounced. Furthermore, steel and nickel pulse welding processes may benefit as well, in accordance with certain embodiments of the present invention.

Figure 5:
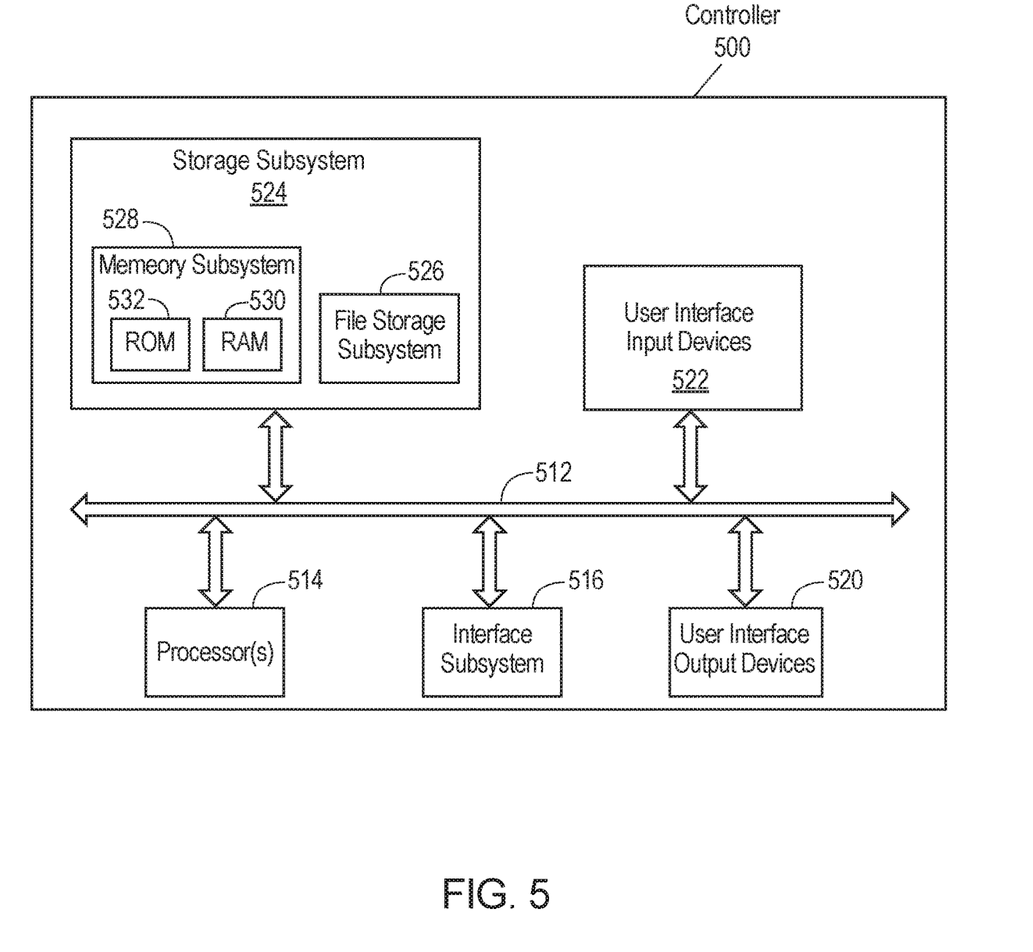
FIG. 5 illustrates one example embodiment of the controller of the welding system of FIG. 1.

FIG. 5 illustrates one example embodiment of a controller 500 (e.g., the controller 150 of the welding system 100 of FIG. 1). The controller 500 includes at least one processor 514 (e.g., a microprocessor) which communicates with a number of peripheral devices via bus subsystem 512. These peripheral devices may include a storage subsystem 524, including, for example, a memory subsystem 528 and a file storage subsystem 526, user interface input devices 522, user interface output devices 520, and a network interface subsystem 516. The input and output devices allow user interaction with the controller 500. Interface subsystem 516 provides an interface to outside devices and networks and is coupled to corresponding interface devices in other computer or electronic systems such as, for example, conventional computers, digital signal processors, and/or other electrical and/or computing devices. For example, in one embodiment, interface subsystem 516 supports interfacing of the controller 500 to the power electronics 130 and the switching network 140, and/or to a wire feeder.

User interface input devices 522 may include a keyboard, pointing devices such as a mouse, trackball, touchpad, or graphics tablet, a scanner, a touchscreen incorporated into a display, audio input devices such as voice recognition systems, microphones, and/or other types of input devices. In general, use of the term "input device" is intended to include all possible types of devices and ways to input information into the controller 500 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 500 to the user or to another machine or computer system.

Storage subsystem 524 stores programming and data constructs that provide or support some or all of the functionality described herein (e.g., as software modules and data). For example, the storage subsystem 524 may include various programmable welding output current pulse parameters and timing algorithms related to the pulse-generating functionality as discussed previously herein.

Software modules are generally executed by processor 514 alone or in combination with other processors. Memory 528 used in the storage subsystem can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 526 in the storage subsystem 524, or in other machines accessible by the processor(s) 514.

Bus subsystem 512 provides a mechanism for letting the various components and subsystems of the controller 500 communicate with each other as intended. Although bus subsystem 512 is shown schematically as a single bus, alternative embodiments of the bus subsystem may use multiple buses.

The controller 500 can be configured as any of various types including a microprocessor and other components on a printed circuit board (PCB), a workstation, a server, a computing cluster, a blade server, a digital signal processor, or any other data processing system or computing device. Due to the ever-changing nature of computing devices and networks, the description of the controller 500 depicted in FIG. 5 is intended only as a specific example for purposes of illustrating some embodiments. Many other configurations of the controller 500 are possible having more or fewer components than the controller depicted in FIG. 5.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A welding power source, the welding power source comprising:
    a pair of welding output studs having a first welding output stud configured to be electrically connected to a consumable welding electrode via at least a first welding cable, and a second welding output stud configured to be electrically connected to a workpiece via at least a second welding cable;
    power electronics configured to generate a plurality of welding output current pulses;
    a switching network operatively connected between the power electronics and the first welding output stud; and
    a controller operatively connected between the power electronics and the switching network, wherein the controller is configured to control a timing of each welding output current pulse of the plurality of welding output current pulses and switch the switching network back and forth between a first welding output current flowing state and a second welding output current impeding state, based on the timing, to effect an increase in a decay rate of a trailing edge of said each welding output current pulse of the plurality of welding output current pulses at the pair of welding output studs during the second welding output current impeding state, wherein the switching network includes a controllable variable resistance to vary a background current level of the plurality of welding output current pulses under control of the controller.

2. The welding power source of claim 1, wherein the switching network includes an electrical switch in parallel with a resistor or a snubber.

3. The welding power source of claim 2, wherein the electrical switch includes a high power transistor and the snubber includes the resistor in series with a capacitor.

4. The welding power source of claim 2, wherein the power electronics includes a main choke that is in series with the resistor or the snubber.

5. The welding power source of claim 2, wherein the electrical switch is closed during the first welding output current flowing state and the electrical switch is open during the second welding output current impeding state.

6. The welding power source of claim 1, wherein the power electronics includes a pulse width modulator configured to operate at an operating frequency of at least 20 kilohertz.

7. The welding power source of claim 1, wherein a pulse repetition rate of the plurality of welding output current pulses is between 50 to 400 cycles per second.

8. A method performed by a welding power source, the method comprising:
    generating a plurality of welding output current pulses in a welding output circuit path;
    controlling shapes and timing parameters of the plurality of welding output current pulses as part of generating the plurality of welding output current pulses;
    effecting an increase in a decay rate of a trailing edge of each welding output current pulse of the plurality of welding output current pulses by introducing an impedance in the welding output circuit path over a period of impeding time for each welding output current pulse of the plurality of welding output current pulses based on the timing parameters.

9. The method of claim 8, further comprising:
    tracking a first time from a beginning of a leading edge to reaching a peak amplitude of each welding output current pulse of the plurality of welding output current pulses;
    determining when a second time has elapsed corresponding to a duration of the peak amplitude for each welding output current pulse of the plurality of welding output current pulses; and
    starting the effecting of the increase in the decay rate of the trailing edge of each welding output current pulse of the plurality of welding output current pulses in response to the second time elapsing.

10. The method of claim 8, wherein the timing parameters include the period of impeding time and at least one of:
    a pulse repetition frequency of the plurality of welding output current pulses,
    a pulse width of each welding output current pulse of the plurality of welding output current pulses,
    a leading edge start time of each welding output current pulse of the plurality of welding output current pulses,
    a time when a peak amplitude is first reached for each welding output current pulse of the plurality of welding output current pulses,
    a peak amplitude time duration after the peak amplitude is first reached for each welding output current pulse of the plurality of welding output current pulses, and
    a trailing edge start time for each welding output current pulse of the plurality of welding output current pulses.

11. The method of claim 8, wherein the plurality of welding output current pulses are positive polarity current pulses.

12. The method of claim 8, wherein the plurality of welding output current pulses are negative polarity current pulses.

13. The method of claim 8, wherein the plurality of welding output current pulses include both positive polarity current pulses and negative polarity current pulses.

14. The method of claim 8, wherein the method is performed during a low wire feed speed stainless, nickel, or steel pulse welding process.

15. The method of claim 8, further comprising varying the impedance in a controlled manner to change a background current level of the plurality of welding output current pulses.

16. The method of claim 8, wherein introducing the impedance in the welding output circuit path is accomplished by opening an electrical switch that is in parallel with a resistor or a snubber.

17. The method of claim 16, further comprising removing the impedance in the welding output circuit path by closing the electrical switch after the period of impeding time.

18. A welding power source, the welding power source comprising:
- a pair of welding output studs having a first welding output stud configured to be electrically connected to a consumable welding electrode via at least a first welding cable, and a second welding output stud configured to be electrically connected to a workpiece via at least a second welding cable;
- power electronics configured to generate a plurality of welding output current pulses;
- a switching network operatively connected between the power electronics and the first welding output stud; and
- a controller operatively connected between the power electronics and the switching network, wherein the controller is configured to control a timing of each welding output current pulse of the plurality of welding output current pulses and switch the switching network back and forth between a first welding output current flowing state and a second welding output current impeding state, based on the timing, to effect an increase in a decay rate of a trailing edge of said each welding output current pulse of the plurality of welding output current pulses at the pair of welding output studs during the second welding output current impeding state, and
- wherein the controller is configured to effect the increase in the decay rate of the trailing edge of said each welding output current pulse of the plurality of welding output current pulses at the pair of welding output studs, via the timing and the switching network, when an inductance of a welding output circuit path operatively connected to the welding power source via the pair of welding output studs is above a defined threshold value, wherein the welding output circuit path includes the first welding cable, at least a portion of the consumable welding electrode, at least a portion of the workpiece, and the second welding cable.

19. A welding power source, the welding power source comprising:
- a pair of welding output studs having a first welding output stud configured to be electrically connected to a consumable welding electrode via at least a first welding cable, and a second welding output stud configured to be electrically connected to a workpiece via at least a second welding cable;
- power electronics configured to generate a plurality of welding output current pulses;
- a switching network operatively connected between the power electronics and the first welding output stud; and
- a controller operatively connected between the power electronics and the switching network, wherein the controller is configured to control a timing of each welding output current pulse of the plurality of welding output current pulses and switch the switching network back and forth between a first welding output current flowing state and a second welding output current impeding state, based on the timing, to effect an increase in a decay rate of a trailing edge of said each welding output current pulse of the plurality of welding output current pulses at the pair of welding output studs during the second welding output current impeding state, and
- wherein the controller is configured to effect the increase in the decay rate of the trailing edge of said each welding output current pulse of the plurality of welding output current pulses at the pair of welding output studs, via the timing and the switching network, when a welding wire feed speed of a wire feeder, operatively connected to the welding power source and feeding the consumable welding electrode, is below a defined threshold value.

* * * * *